United States Patent
Nakayama

(10) Patent No.: US 12,341,457 B2
(45) Date of Patent: Jun. 24, 2025

(54) CONTROL APPARATUS AND ROBOT SYSTEM

(71) Applicant: SEIKO EPSON CORPORATION, Tokyo (JP)

(72) Inventor: Junpei Nakayama, Matsumoto (JP)

(73) Assignee: SEIKO EPSON CORPORATION (JP)

(*) Notice: Subject to any disclaimer, the term of this patent is extended or adjusted under 35 U.S.C. 154(b) by 193 days.

(21) Appl. No.: 18/192,766

(22) Filed: Mar. 30, 2023

(65) Prior Publication Data

US 2023/0318507 A1 Oct. 5, 2023

(30) Foreign Application Priority Data

Mar. 31, 2022 (JP) .................................. 2022-060178

(51) Int. Cl.
*H02P 27/08* (2006.01)
*H02P 23/26* (2016.01)

(52) U.S. Cl.
CPC ............ *H02P 27/08* (2013.01); *H02P 23/26* (2016.02); *H02P 2201/03* (2013.01); *H02P 2201/11* (2013.01); *H02P 2201/15* (2013.01)

(58) Field of Classification Search
CPC .................................. H02P 23/26; H02P 27/08
See application file for complete search history.

(56) References Cited

U.S. PATENT DOCUMENTS

| | | | | |
|---|---|---|---|---|
| 2004/0245951 | A1* | 12/2004 | Yamada | .................. H02P 23/07 318/376 |
| 2012/0235613 | A1* | 9/2012 | Huang | .................. B60L 3/0092 318/400.26 |

FOREIGN PATENT DOCUMENTS

| | | |
|---|---|---|
| JP | H03-036974 A | 2/1991 |
| JP | 2602952 B2 | 4/1997 |
| JP | 2001-320830 A | 11/2001 |
| JP | 2004-364462 A | 12/2004 |
| JP | 2006-280076 A | 10/2006 |

* cited by examiner

Primary Examiner — Said Bouziane
(74) Attorney, Agent, or Firm — Harness, Dickey & Pierce, P.L.C.

(57) ABSTRACT

A control apparatus includes a drive circuit unit to which regenerative electric power is input, a discharge resistance unit parallel-coupled to the drive circuit unit, to which the regenerative electric power is input from the drive circuit unit, and, when a voltage value of the regenerative electric power exceeds a threshold value, consuming electric power, a second converter circuit unit parallel-coupled to a first converter circuit unit and converting and outputting an alternating current into a direct current, a step-down circuit unit stepping down and outputting a voltage of the current output from the second converter circuit unit, an energization control circuit unit actuated by the direct current and controlling the drive circuit unit, and a regenerative electric power supply unit having a regenerative diode coupled to the discharge resistance unit and outputting a direct current of the regenerative electric power to the step-down circuit unit.

8 Claims, 6 Drawing Sheets

CONTROL APPARATUS AND ROBOT SYSTEM

The present application is based on, and claims priority from JP Application Serial Number 2022-060178, filed Mar. 31, 2022, the disclosure of which is hereby incorporated by reference herein in its entirety.

BACKGROUND

1. Technical Field

The present disclosure relates to a control apparatus and a robot system.

2. Related Art

Recently, in factories, due to rises in labor costs and shortages of human resources, work of manufacturing, processing, assembly, etc. has been performed by robots having robot arms and work that had been manually performed has been acceleratingly automated. Further, power-saving driving of the robots is required.

For example, a robot control apparatus of a robot disclosed in JP-A-2006-280076 has a smoothing capacitor storing regenerative electric power generated in a motor for driving a robot arm. The regenerative electric power is stored in the smoothing capacitor and used for driving of e.g., a DC fan.

However, in the robot control apparatus disclosed in JP-A-2006-280076, the stored regenerative electric power is supplied to the DC fan that intermittently consumes electric power, and it is necessary to discharge with the times when the electric power is consumed and the control and the configuration are complex. As described above, it is difficult to effectively utilize the regenerative electric power in a simple configuration.

SUMMARY

A control apparatus according to an aspect of the present disclosure is a control apparatus controlling driving of a motor of a robot arm, including a terminal supplying electric power from an alternating-current power supply, a plurality of input/output terminals inputting and outputting electric power to and from the motor, a first converter circuit unit converting and outputting an alternating current input from the terminal into a direct current, a drive circuit unit converting and outputting the direct current output from the first converter circuit unit to the plurality of input/output terminals, to which regenerative electric power from the motor is input from the plurality of input/output terminals, a discharge resistance unit parallel-coupled to the drive circuit unit, to which the regenerative electric power is input from the drive circuit unit, and, when a voltage value of the regenerative electric power exceeds a threshold value, consuming electric power, a second converter circuit unit parallel-coupled to the first converter circuit unit and converting and outputting the alternating current input from the terminal into a direct current, a first step-down circuit unit stepping down and outputting a voltage of the current output from the second converter circuit unit, an energization control circuit unit actuated by the direct current output from the first step-down circuit unit and controlling the drive circuit unit, and a regenerative electric power supply unit having a regenerative diode coupled to the discharge resistance unit and outputting a direct current of the regenerative electric power to the first step-down circuit unit.

A robot system according to an aspect of the present disclosure includes a robot having a robot arm, and the control apparatus controlling driving of the robot arm according to the aspect of the present disclosure.

DESCRIPTION OF EXEMPLARY EMBODIMENTS

As below, a control apparatus of the present disclosure will be explained in detail based on preferred embodiments shown in the accompanying drawings.

Embodiment

Figure 1:
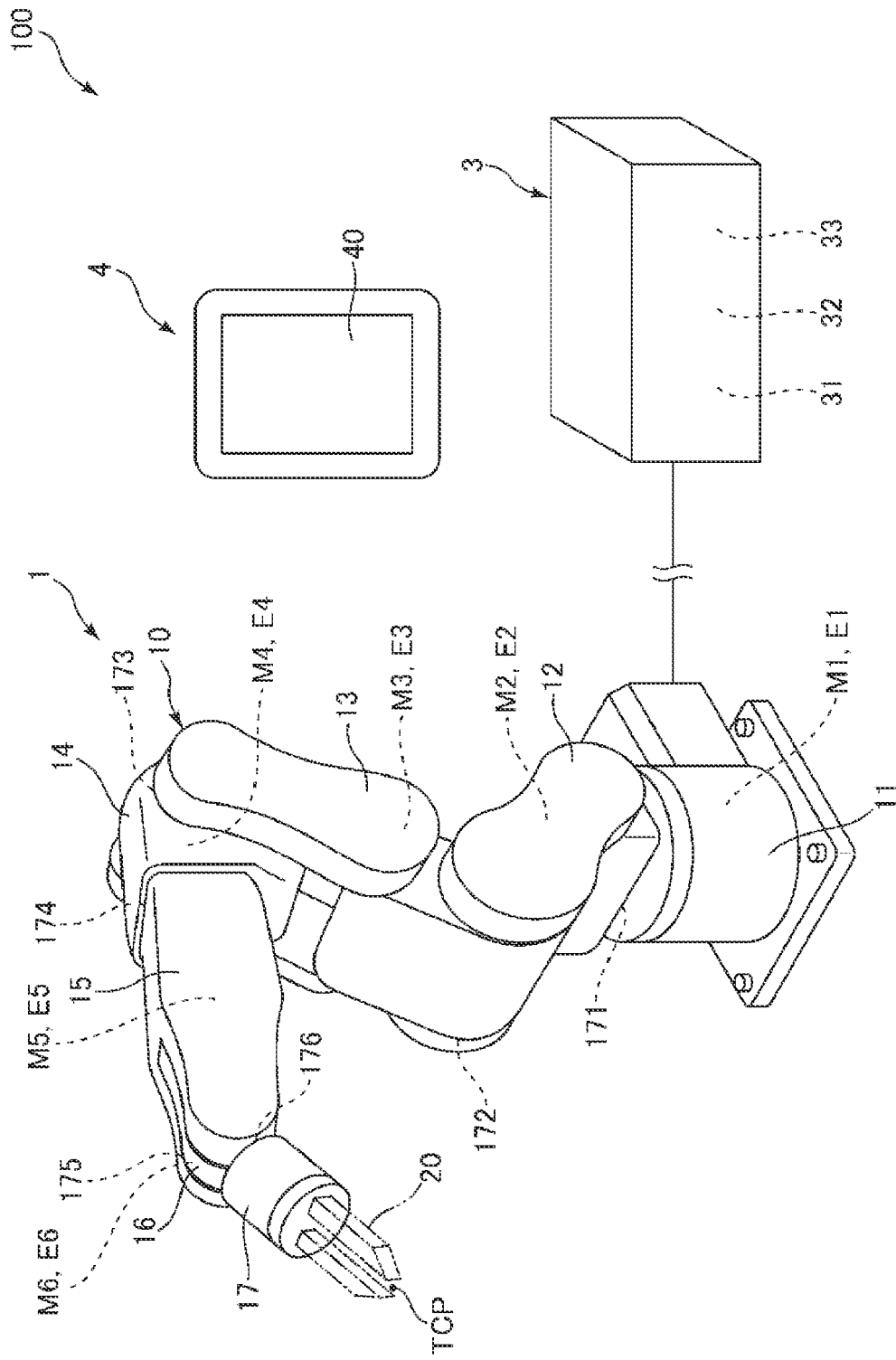
FIG. 1 shows an overall configuration of a robot system including a control apparatus of the present disclosure.
Figure 2:
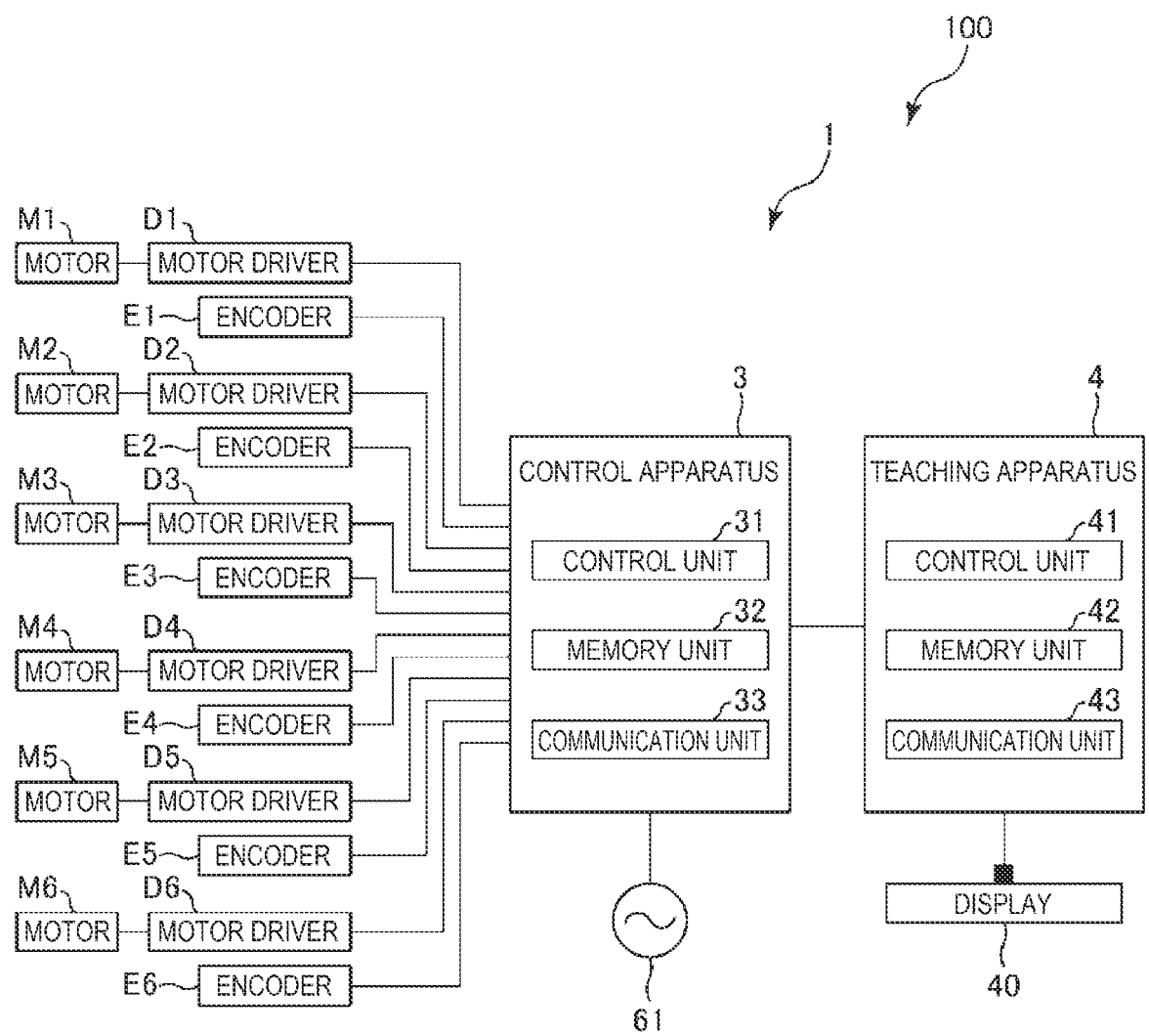
FIG. 2 is a block diagram of the robot system shown in FIG. 1.
Figure 3A:
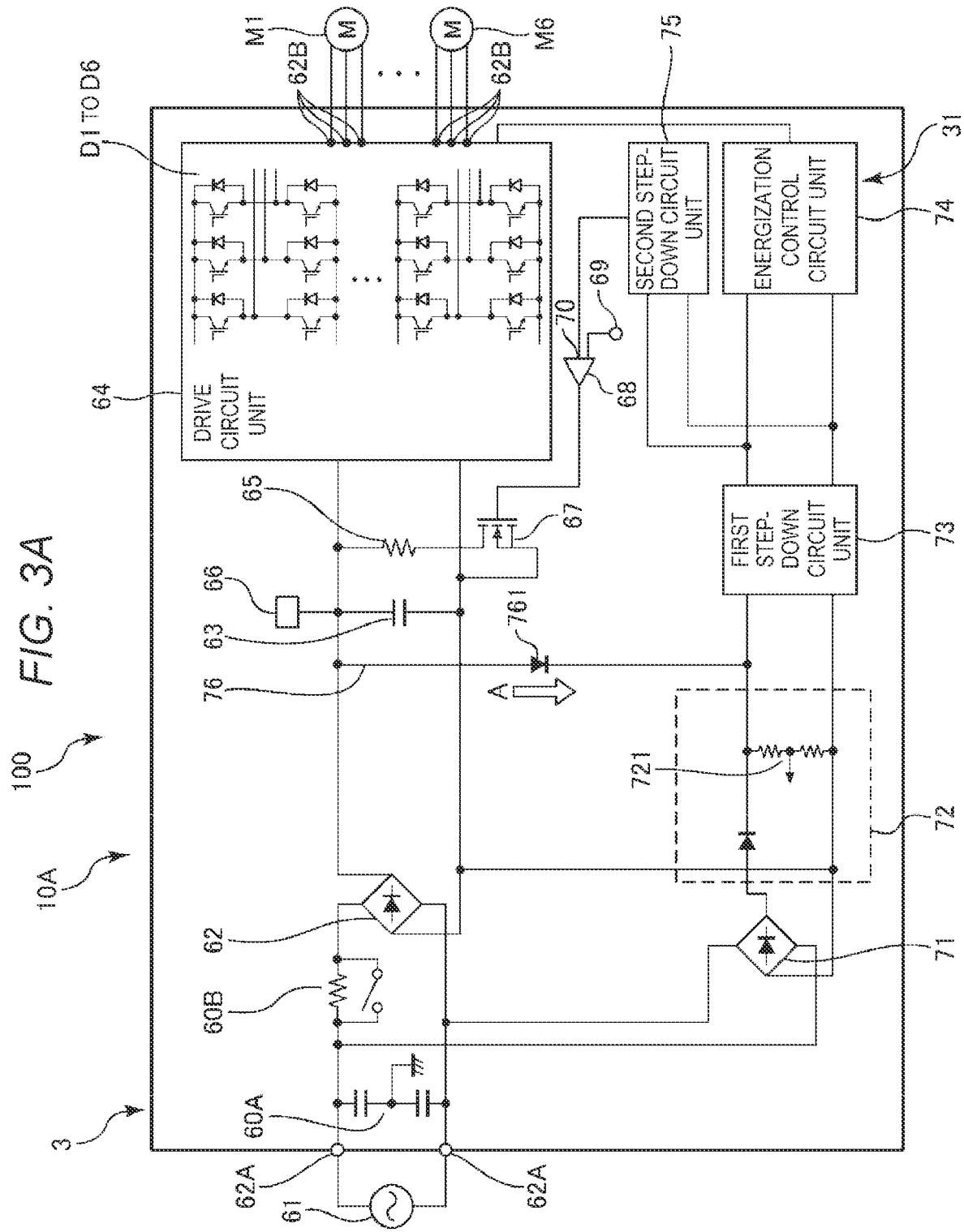
FIG. 3A is a circuit diagram of the control apparatus shown in FIG. 1.
Figure 3B:
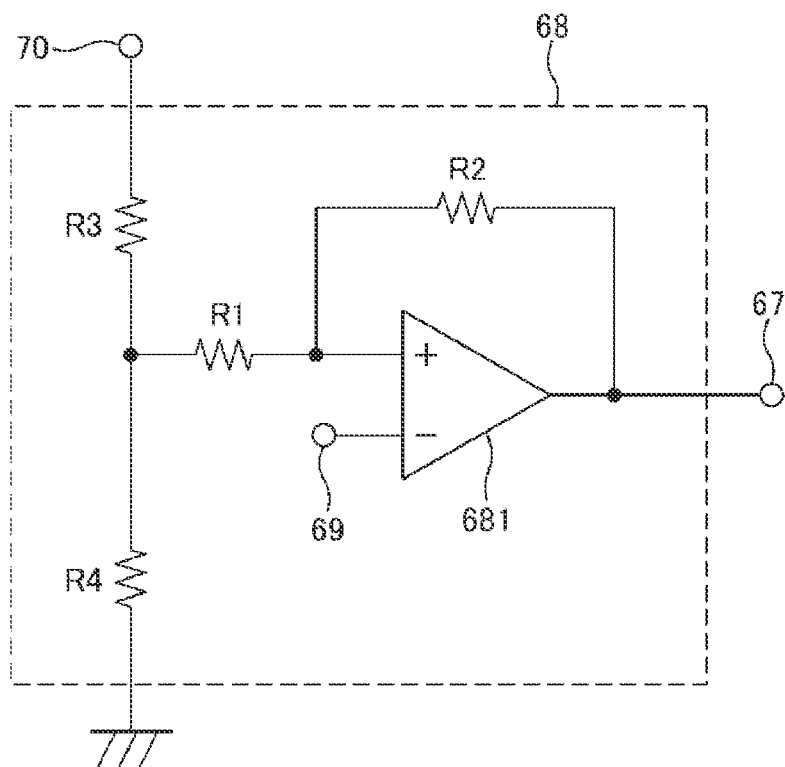
FIG. 3B is a circuit diagram of a comparator shown in FIG. 3A.
Figure 4:
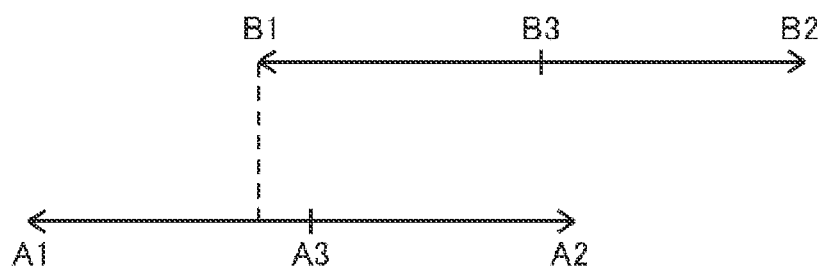
FIG. 4 shows an example of a relationship between a threshold value of a voltage of regenerative electric power from a motor shown in FIG. 1 and a voltage value of electric power input to a first step-down circuit unit.
Figure 5:
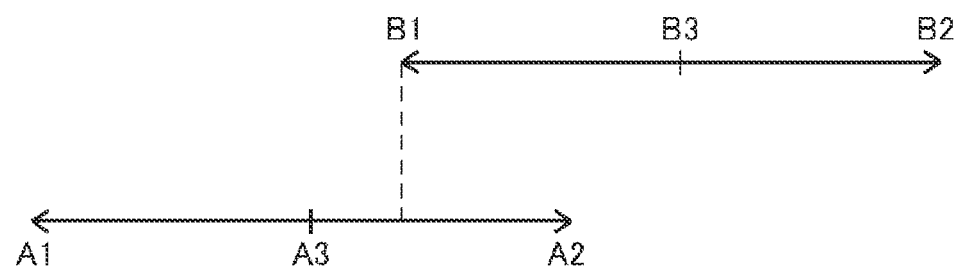
FIG. 5 shows an example of the relationship between the threshold value of the voltage of regenerative electric power from the motor shown in FIG. 1 and the voltage value of electric power input to the first step-down circuit unit.
Figure 6:
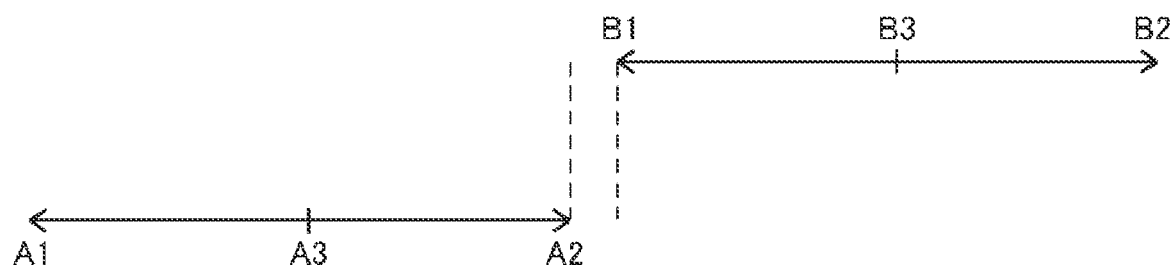
FIG. 6 shows an example of the relationship between the threshold value of the voltage of regenerative electric power from the motor shown in FIG. 1 and the voltage value of electric power input to the first step-down circuit unit.
Figure 7:
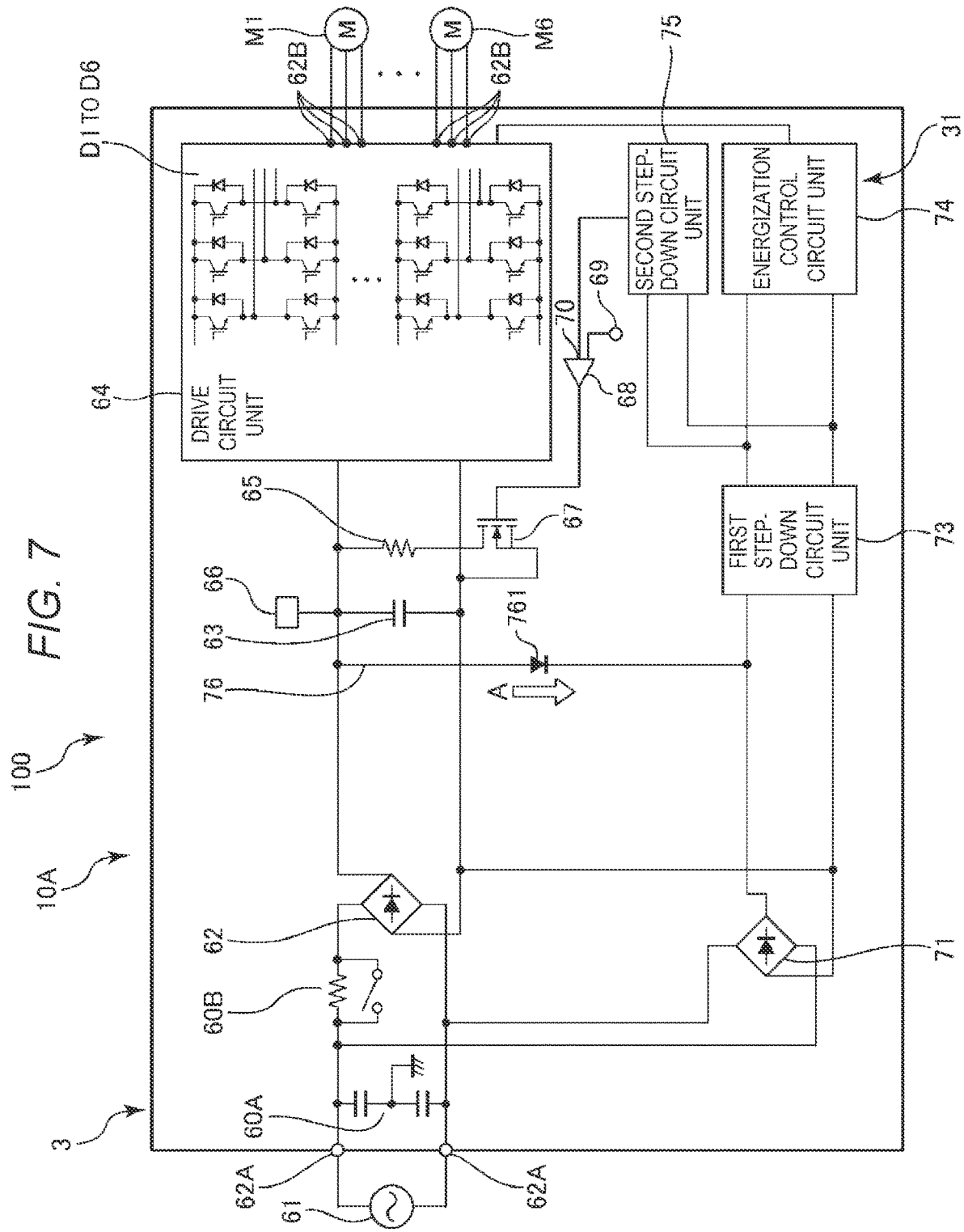
FIG. 7 shows a modified example of the circuit diagram of the control apparatus shown in FIG. 1.

FIG. 1 shows an overall configuration of a robot system including a control apparatus of the present disclosure. FIG. 2 is a block diagram of the robot system shown in FIG. 1. FIG. 3A is a circuit diagram of the control apparatus shown in FIG. 1. FIG. 3B is a circuit diagram of a comparator shown in FIG. 3A. FIG. 4 shows an example of a relationship between a threshold value of a voltage of regenerative electric power from a motor shown in FIG. 1 and a voltage value of electric power input to a first step-down circuit unit. FIG. 5 shows an example of the relationship between the threshold value of the voltage of regenerative electric power from the motor shown in FIG. 1 and the voltage value of electric power input to the first step-down circuit unit. FIG. 6 shows an example of the relationship between the threshold value of the voltage of regenerative electric power from the motor shown in FIG. 1 and the voltage value of electric power input to the first step-down circuit unit. FIG. 7 shows a modified example of the circuit diagram of the control apparatus shown in FIG. 1.

Hereinafter, for convenience of explanation, with respect to a robot arm 10, a base 11 side in FIG. 1 is referred to as "proximal end" and the opposite side thereto, i.e., an end effector 20 side is referred to as "distal end".

As shown in FIG. 1, a robot system 100 of the present disclosure includes a robot 1, a control apparatus 3 controlling the robot 1, and a teaching apparatus 4.

First, the robot 1 is explained.

The robot 1 shown in FIG. 1 is a single-arm six-axis vertical articulated robot in the embodiment and has a base 11 and the robot arm 10. An end effector 20 is attachable to the distal end portion of the robot arm 10. Note that the end effector 20 may be a component element of the robot 1, or a separate member from the robot 1, that is, not a component element of the robot 1.

The robot 1 is not limited to the illustrated configuration, but may be e.g., a dual-arm articulated robot. Or, the robot 1 may be a horizontal articulated robot.

The base 11 is a supporter supporting the robot arm 10 drivably at the proximal end side thereof and fixed to e.g., a floor within a factory. The base 11 of the robot 1 is electrically coupled to the control apparatus 3 via a relay cable. Note that the coupling between the robot 1 and the control apparatus 3 is not limited to the wired coupling like the configuration shown in FIG. 1, but may be e.g., wireless coupling. Or, the robot 1 and the control apparatus 3 may be coupled via a network such as the Internet.

In the embodiment, the robot arm 10 has a first arm 12, a second arm 13, a third arm 14, a fourth arm 15, a fifth arm 16, and a sixth arm 17 and these arms are sequentially coupled from the base 11 side. Note that the number of arms of the robot arm 10 is not limited to six, but may be one, two, three, four, five, seven, or more. The sizes including the entire lengths of the respective arms are respectively not particularly limited, but can be appropriately set.

The base 11 and the first arm 12 are coupled via a joint 171. Further, the first arm 12 is pivotable around a first pivot axis extending in parallel to the vertical directions as a pivot center relative to the base 11. The first pivot axis is aligned with the normal of the floor surface of the floor to which the base 11 is fixed.

The first arm 12 and the second arm 13 are coupled via a joint 172. Further, the second arm 13 is pivotable around a second pivot axis extending in the horizontal directions as a pivot center relative to the first arm 12. The second pivot axis is parallel to an axis orthogonal to the first pivot axis.

The second arm 13 and the third arm 14 are coupled via a joint 173. Further, the third arm 14 is pivotable around a third pivot axis extending in the horizontal directions as a pivot center relative to the second arm 13. The third pivot axis is parallel to the second pivot axis.

The third arm 14 and the fourth arm 15 are coupled via a joint 174. Further, the fourth arm 15 is pivotable around a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable around a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable around a sixth pivot axis as a pivot center relative to the fifth arm 16. The sixth pivot axis is orthogonal to the fifth pivot axis.

The sixth arm 17 is an arm located at the most distal end side of the robot arm 10. The sixth arm 17 may be displaced together with the end effector 20 by driving of the robot arm 10.

The end effector 20 shown in FIG. 1 has a gripping portion that may grip a workpiece or a tool. In a state in which the end effector 20 is attached to the sixth arm 17, the distal end portion of the end effector 20 is a tool center point TCP.

The robot 1 includes a motor M1, a motor M2, a motor M3, a motor M4, a motor M5, and a motor M6 as drive units and an encoder E1, an encoder E2, an encoder E3, an encoder E4, an encoder E5, and an encoder E6. The motor M1 is provided inside the joint 171 and rotates the first arm 12 around the first pivot axis relative to the base 11. The motor M2 is provided inside the joint 172 and relatively rotates the first arm 12 and the second arm 13 around the second pivot axis. The motor M3 is provided inside the joint 173 and relatively rotates the second arm 13 and the third arm 14 around the third pivot axis. The motor M4 is provided inside the joint 174 and relatively rotates the third arm 14 and the fourth arm 15 around the fourth pivot axis. The motor M5 is provided inside the joint 175 and relatively rotates the fourth arm 15 and the fifth arm 16 around the fifth pivot axis. The motor M6 is provided inside the joint 176 and relatively rotates the fifth arm 16 and the sixth arm 17 around the sixth pivot axis. The respective motors M1 to M6 are three-phase motors driven by three-phase alternating currents.

Further, the encoder E1 is provided inside the joint 171 and detects the position of the motor M1. The encoder E2 is provided inside the joint 172 and detects the position of the motor M2. The encoder E3 is provided inside the joint 173 and detects the position of the motor M3. The encoder E4 is provided inside the joint 174 and detects the position of the motor M4. The encoder E5 is provided inside the fifth arm 16 and detects the position of the motor M5. The encoder E6 is provided inside the sixth arm 17 and detects the position of the motor M6. Note that "detect the position" here is to detect the rotation angle of the motor, i.e., an amount of forward or backward rotation and an angular velocity, and the detected information is referred to as "position information".

As shown in FIG. 2, motor driver D1 to motor driver D6 are coupled to the corresponding motor M1 to motor M6, respectively, and control driving of the motors. The motor driver D1 to motor driver D6 are provided inside the joint 171, the joint 172, the joint 173, the joint 174, the fifth arm 16, and the sixth arm 17, respectively.

The encoder E1 to encoder E6, the motor M1 to motor M6, and the motor driver D1 to motor driver D6 are respectively electrically coupled to the control apparatus 3. The position information of the motor M1 to motor M6 detected by the encoder E1 to encoder E6, i.e., the amounts of rotation etc. are transmitted as electrical signals to the control apparatus 3. An energization control circuit unit 74 in an electric power control circuit 10A of the control apparatus 3 outputs control signals to the motor driver D1 to motor driver D6 shown in FIG. 2 based on the position information and controls energization of the motor M1 to motor M6 to desirably drive the motor M1 to motor M6. That is, to control the robot arm 10 is to control driving of the motor M1 to motor M6 to control actuation of the first arm 12 to sixth arm 17 of the robot arm 10.

The end effector 20 may be detachably attached to the distal end portion of the robot arm 10. In the embodiment, the end effector 20 includes a hand having a pair of claw portions movable close to or apart from each other and gripping and releasing a workpiece or a tool by the respective claw portions. Note that the end effector 20 is not limited to the illustrated configuration, but may have e.g., a suction portion and grip a workpiece or a tool by suction using the suction portion. Or, the end effector 20 may be a tool e.g., a polisher, a grinder, a cutter, a spray gun, a laser beam irradiator, a driver, a wrench, or the like.

Next, the control apparatus 3 and the teaching apparatus 4 will be explained.

As shown in FIG. 1, the control apparatus 3 is placed in a position apart from the robot 1 in the embodiment. The control apparatus 3 is not limited to the configuration, but may be provided inside the base 11. Further, the control apparatus 3 has a function of controlling driving of the robot 1 and is electrically coupled to the above described motor M1 to motor M6, an alternating-current power supply 61, and the other respective units of the robot. The control apparatus 3 has a control unit 31, a memory unit 32, and a communication unit 33. These respective units are coupled to mutually communicate via e.g., a bus.

The control unit 31 includes e.g., a CPU (Central Processing Unit) and reads out and executes various programs such as a motion program stored in the memory unit 32. The signals generated by the control unit 31 are transmitted to the respective units of the robot 1 via the communication unit 33 and the signals from the respective units of the robot 1 are received by the control unit 31 via the communication unit 33. Thereby, the robot arm 10 may execute predetermined work in predetermined conditions.

The memory unit 32 stores the various programs etc. to be executed by the control unit 31. The memory unit 32 includes e.g., a volatile memory such as a RAM (Random Access Memory), a nonvolatile memory such as a ROM (Read Only Memory), and a detachable external memory device.

The communication unit 33 transmits and receives signals between the control apparatus 3 and itself using an external interface, e.g., a wired LAN (Local Area Network), a wireless LAN, or the like. In this case, the communication may be made via a server (not shown) or via a network such as the Internet.

As shown in FIGS. 1 and 2, the teaching apparatus 4 is a command apparatus for teaching and has a display 40 as a display unit. The display 40 is also an operation unit for teaching the motion program to the robot arm 10. That is, the display has a function of creating and inputting the motion program. The display 40 includes a touch panel and various operations and information input for teaching are performed by a worker to operate with a finger or a touch pen. The display 40 includes e.g., liquid crystal, organic EL, or the like and may display various windows in several colors or black and white. As a system of the touch panel, a pressure-sensitive system or a capacitive system may be used.

The teaching apparatus 4 has a control unit 41, a memory unit 42, and a communication unit 43.

The control unit 41 includes at least a processor e.g., a CPU (Central Processing Unit) and reads out and executes various programs such as a teaching program stored in the memory unit 42. The control unit 41 has a function of controlling actuation of the display 40. Specifically, the control unit 41 displays a rectangular operation window on the display 40 and generates a motion program for the robot 1 based on the information input from the operation window by touching of a desired location or the like. The motion program generated in the control unit 41 is stored in the memory unit 42 and transmitted to the control apparatus 3 via the communication unit 43. Thereby, a program for the robot arm 10 to execute predetermined work in predetermined conditions may be designated via the control apparatus 3.

The memory unit 42 stores the various programs etc. that can be executed by the control unit 41. The memory unit 42 includes e.g., a volatile memory such as a RAM (Random Access Memory), a nonvolatile memory such as a ROM (Read Only Memory), and a detachable external memory device. Further, the motion program created by the control unit 41 is stored in the memory unit 42.

The communication unit 43 transmits and receives signals between the control apparatus 3 and itself using an external interface, e.g., a wired LAN (Local Area Network), a wireless LAN, or the like. In this case, the communication may be made via a server (not shown) or via a network such as the Internet. The communication unit 43 transmits information on the motion program stored in the memory unit 42 to the control apparatus 3. Further, the communication unit 43 may receive the information stored in the memory unit 32 and store the information in the memory unit 42.

Next, referring to FIG. 3A, the control apparatus 3 of the robot system 100 will be explained in detail. The control apparatus 3 has the control unit 31 and the control unit 31 has the electric power control circuit 10A. The electric power control circuit 10A has input terminals (terminals) 62A, a denoising capacitor 60A, an inrush prevention resistance unit 60B, a first converter circuit unit 62, a regenerative capacitor 63 electrically coupled to the output side of the first converter circuit unit 62, a drive circuit unit 64, input/output terminals 62B, a discharge resistance unit 65, a potential detection unit 66, a switch 67, a comparator 68, a second converter circuit unit 71, a power factor corrector unit 72, a first step-down circuit unit 73, the energization control circuit unit 74, a second step-down circuit unit 75, and a regenerative electric power supply unit 76. Note that the term "coupling" includes not only direct coupling between terminals but also coupling between terminals via an electric wire or the like.

The alternating-current power supply 61 is e.g., an alternating-current power supply of 200 V. The electric power output by the alternating-current power supply 61, i.e., electric energy is input to the first converter circuit unit 62 through the input terminals 62A, the denoising capacitor 60A, and the inrush prevention resistance unit 60B. The input terminals 62A are terminals to which electric power is supplied from the alternating-current power supply 61 and an alternating current is input thereto. As shown in FIG. 3A, two input terminals 62A are respectively coupled to the first converter circuit unit 62, which will be described later, by electric wires. The electric wire coupling from the lower input terminal 62A to the first converter circuit unit 62 is a low-potential electric wire, and the electric wire coupling from the upper input terminal 62A to the first converter circuit unit 62 is a high-potential electric wire at a higher potential than the low-potential electric wire. Further, the two input terminals 62A are respectively coupled to the second converter circuit unit 71, which will be described later, by electric wires. The electric wire coupling from the lower input terminal 62A to the second converter circuit unit 71 is a low-potential electric wire, and the electric wire coupling from the upper input terminal 62A to the second converter circuit unit 71 is a high-potential electric wire at a higher potential than the low-potential electric wire. In the embodiment, the low-potential electric wires are respectively grounded.

The denoising capacitor 60A has series-coupled two capacitors and a grounding wire is coupled between these capacitors. Through the denoising capacitor 60A, noise of the electric power output by the alternating-current power supply 61 is removed and the electric power can be stably supplied.

The inrush prevention resistance unit 60B is provided on the high-potential electric wire, has a resistor and a switch bypassing the resistor, and blocks a flow of an inrush current. At the time when the control apparatus 3 is activated or the like, an excessive current called an inrush current is generated for storage in the regenerative capacitor 63 etc. Accordingly, at the time when the control apparatus 3 is activated or the like, the switch is turned off, the current flows in the resistor and the electric power is consumed, and a flow of an inrush current in the first converter circuit unit 62 or the like is blocked. Thereby, safety may be increased. On the other hand, after the control apparatus 3 is activated, electric power is stored in the capacitor etc. and no inrush current is generated, and the switch is turned on, no current flows in the resistor, and electric power consumption by the resistor may be suppressed.

The first converter circuit unit 62 is a bridge rectifier circuit using a diode, and converts the alternating current input from the alternating-current power supply 61 through the denoising capacitor 60A and the inrush prevention resistance unit 60B into a direct current and outputs the current.

The regenerative capacitor 63 is coupled to the output side of the first converter circuit unit 62. In the regenerative capacitor 63, regenerative electric power generated in the motor M1 to motor M6 is stored. The regenerative capacitor 63 also functions as a smoothing capacitor and smooths the voltage output from the first converter circuit unit 62.

The drive circuit unit 64 has the motor driver D1 to motor driver D6. Each of the motor driver D1 to motor driver D6 has an inverter circuit including six switching elements. The motor driver D1 to motor driver D6 respectively perform PWM control and convert the direct currents output from the first converter circuit unit 62 into alternating currents, in the embodiment, three-phase alternating currents and selectively supply the currents to the corresponding motor M1 to motor M6 via the input/output terminals 62B, respectively. Further, the motor M1 to motor M6 generate regenerative electric power, which will be described later, and the regenerative electric power is input to the motor driver D1 to motor driver D6 via the input/output terminals 62B. Note that the magnitude and the times of the electric power output from the drive circuit unit 64 to the respective motor M1 to motor M6 are set by the energization control circuit unit 74. As shown in FIG. 3A, two terminals of the drive circuit unit 64 are respectively coupled to the first converter circuit unit 62 by electric wires. The electric wire coupling from the lower terminal of the drive circuit unit 64 to the first converter circuit unit 62 is a low-potential electric wire, and the electric wire coupling from the upper terminal of the drive circuit unit 64 to the first converter circuit unit 62 is a high-potential electric wire at a higher potential than the low-potential electric wire. In the embodiment, the low-potential electric wire is grounded.

The terminals outputting from the drive circuit unit 64 to the motor M1 to motor M6 are respectively the input/output terminals 62B. Through the input/output terminals 62B, electric power is input and output between the motor driver D1 to motor driver D6 and the motor M1 to motor M6. The respective motor M1 to motor M6 are three-phase motors and three input/output terminals 62B are provided for each motor.

The motor M1 to motor M6 are driven, and thereby, the robot arm 10 is driven and displaced. When the energization of the motor M1 to motor M6 is stopped to abruptly decelerate or stop the displacement of the robot arm 10, the robot arm 10 during displacement is not instantly stopped due to the inertial force thereof and back electromotive forces, i.e., regenerative electric power is generated in the motor M1 to motor M6.

The motor M1 to motor M6 respectively independently generate regenerative electric power. "Regenerative electric power" to be described refers to total electric power of the regenerative electric power respectively generated in the motor M1 to motor M6.

The discharge resistance unit 65 is coupled to the drive circuit unit 64 in parallel and, when the energization is stopped to decelerate the motor M1 to motor M6, that is, when the regeneration of the motor M1 to motor M6 is performed, converts the regenerative electric power as the regenerative energy generated in the motor M1 to motor M6 into heat and consumes the heat. The regeneration is to actuate drive sources such as the motor M1 to motor M6 to generate back electromotive forces at abrupt deceleration, that is, to actuate the drive sources as power generators.

When the motor M1 to motor M6 are driven, the energization control circuit unit 74 is actuated by the electric power from the alternating-current power supply 61 and controls the drive circuit unit 64 and distributes alternating currents, particularly, three-phase alternating currents to the motor M1 to motor M6 at predetermined times, predetermined frequencies, and predetermined voltages. On the other hand, when the driving of the motor M1 to motor M6 is stopped, the energization control circuit unit 74 controls the drive circuit unit 64 to stop the energization of the motor M1 to motor M6. Here, as described above, the back electromotive forces are generated in the motor M1 to motor M6 and the electric power is stored in the regenerative capacitor 63. When the electric power exceeds the capacity of the regenerative capacitor 63, the residual electric power is converted into heat in the discharge resistance unit 65, and the discharge resistance unit 65 generates heat and the heat is released.

Further, the switch 67 is series-coupled to the discharge resistance unit 65. When the switch 67 is on, electric power is supplied to the discharge resistance unit 65 and, when the switch 67 is off, electric power is not supplied to the discharge resistance unit 65.

The potential detection unit 66 detects the potential of the regenerative capacitor 63. A signal corresponding to the detection value detected by the potential detection unit 66 is input to a terminal 69 of the comparator 68.

The comparator 68 generates a signal for turning on the switch 67 when the voltage value of the regenerative electric power from the motor M1 to motor M6 exceeds a threshold value. That is, the comparator 68 compares the detection result of the potential detection unit 66, i.e., the voltage value of the regenerative electric power to the set threshold value, and outputs a signal according to the comparison result to the switch 67. When the voltage value of the regenerative electric power is larger than the threshold value, the comparator 68 outputs the signal for turning on the switch 67 to the switch 67. On the other hand, when the voltage value of the regenerative electric power is smaller than the threshold value, the comparator 68 outputs a signal for turning off the switch 67 to the switch 67. Note that, hereinafter, the threshold value is also referred to as "threshold value B". Further, as shown in FIG. 3B, the comparator 68 has a comparator main body 681 comparing and outputting a signal according to a comparison result, the terminal 69 coupling to the potential detection unit 66, a terminal 70 coupling to the second step-down circuit unit 75, which will be described later, a resistor R1 placed on the electric wire coupling the comparator main body 681 and the terminal 70, a resistor R2 placed on the electric wire coupling between the comparator main body 681 and the resistor R1 and the electric wire at the output side of the comparator main body

681 and obtaining hysteresis by bypassing the comparator main body 681, a resistor R3 placed closer to the terminal 70 than the resistor R1, and a resistor R4 placed on the electric wire coupling between the resistor R1 and the resistor R3 and the ground.

Of the electric power control circuit 10A, that part described above except the comparator 68 is a circuit at "strong electric side" to which a higher voltage is applied. Next, of the electric power control circuit 10A, a circuit at "weak electric side" to which a lower voltage than that to "strong electric side" is applied will be explained.

The second converter circuit unit 71 is coupled to the first converter circuit unit 62 in parallel and converts the alternating current input from the alternating-current power supply 61 through the input terminals 62A, the denoising capacitor 60A, and the inrush prevention resistance unit 60B into a direct current and outputs the current to the power factor corrector unit 72. The second converter circuit unit 71 is a bridge rectifier circuit using a diode.

The power factor corrector unit 72 is a circuit for setting the power factor of the alternating-current power supply 61 closer to "1". Further, the power factor corrector unit 72 has a function of suppressing the high-frequency current generated in the alternating-current power supply 61 to a predetermined value or less and protecting a CPU etc., which will be described later. The power factor corrector unit 72 has an output voltage setting resistor 721 adjusting the output voltage. The resistance value of the output voltage setting resistor 721 is appropriately set, and thereby, the voltage output from the power factor corrector unit 72 to the first step-down circuit unit 73, i.e., the value of the voltage of the current input to the first step-down circuit unit 73 may be set. Hereinafter, the value of the voltage of the current input to the first step-down circuit unit 73 is also referred to as "voltage value A".

As described above, the control apparatus 3 includes the power factor corrector unit 72 correcting and outputting the power factor of the electric power supplied from the regenerative electric power supply unit 76 to the first step-down circuit unit 73. Thereby, the power factor may be corrected and the electric power from the alternating-current power supply 61 may be effectively utilized, and the voltage of the current output to the first step-down circuit unit 73 can be easily set.

The first step-down circuit unit 73 is a linear or switching DC/DC converter and steps down and outputs the input voltage to the energization control circuit unit 74 and the second step-down circuit unit 75. Note that the voltage supplied to the energization control circuit unit 74 and the second step-down circuit unit 75 is stepped down to about 24 V, for example.

The energization control circuit unit 74 and the second step-down circuit unit 75 are coupled in parallel. The energization control circuit unit 74 is a circuit forming a part of the above described control unit 31, actuated by the direct current output from the first step-down circuit unit 73, and controls the drive circuit unit 64. That is, the energization control circuit unit 74 generates and outputs a drive signal to the drive circuit unit 64.

The second step-down circuit unit 75 has the same configurations and functions as the first step-down circuit unit 73 except that the degree of transformation is different, and further steps down and supplies the voltage stepped down by the first step-down circuit unit 73 to the terminal 70 of the comparator 68 as a power supply voltage for comparator. Thereby, the comparator 68 can be actuated. Note that the power supply voltage for comparator supplied to the terminal 70 of the comparator 68 is stepped down by the second step-down circuit unit 75 to about 5 V, for example. The comparator 68 compares the input value from the above described terminal 69 to the input value from the terminal 70 and controls opening and closing of the switch 67. As shown in FIG. 3A, two terminals of the energization control circuit unit 74 and the second step-down circuit unit 75 are respectively coupled to the second converter circuit unit 71 by electric wires. The electric wires coupling from the lower terminals of the energization control circuit unit 74 and the second step-down circuit unit 75 to the second converter circuit unit 71 are low-potential electric wires and the electric wires coupling from the upper terminals of the energization control circuit unit 74 and the second step-down circuit unit 75 to the second converter circuit unit 71 are high-potential electric wires at higher potentials than the low-potential electric wires. In the embodiment, the low-potential electric wires are grounded.

The regenerative electric power supply unit 76 has a regenerative diode 761 outputting the direct current of the regenerative electric power generated at the strong electric side to the first step-down circuit unit 73. Note that the regenerative electric power supplied to the first step-down circuit unit 73 by the regenerative electric power supply unit 76 includes the direct regenerative electric power generated in the motor M1 to motor M6 and the regenerative electric power discharged by the regenerative capacitor 63. The regenerative electric power supply unit 76 has a terminal at the input side of the regenerative diode 761, i.e., an anode coupled to a high-potential electric wire between the output side terminal of the first converter circuit unit 62 and the discharge resistance unit 65 and a terminal at the output side of the regenerative diode 761, i.e., a cathode coupled to the input side terminal of the high-potential electric wire of the first step-down circuit unit 73. The regenerative diode 761 permits the regenerative electric power only in one direction, i.e., as shown by an arrow A in FIG. 3A, passing of the current in the direction from the motor M1 to motor M6 side toward the first step-down circuit unit 73 and blocks passing of the current in the opposite direction. In other words, the regenerative electric power supply unit 76 supplies the regenerative electric power from the strong electric side toward the weak electric side. The regenerative electric power supplied by the regenerative electric power supply unit 76 is input to the first step-down circuit unit 73. Further, the regenerative electric power supply unit 76 has an electric wire coupling the low-potential electric wire of the first converter circuit unit 62 and the low-potential electric wire of the second converter circuit unit 71. Thereby, the two low-potential electric wires can be set at an equal potential and, as will be described later, the frequency of supply of the regenerative electric power to the energization control circuit unit 74 may be further increased and the regenerative electric power may be utilized more effectively.

In related art, there is no supply unit corresponding to the regenerative electric power supply unit 76 and the regenerative electric power is not supplied from the strong electric side to the weak electric side, and the regenerative electric power is not effectively utilized. However, in the present disclosure, the regenerative electric power is supplied from the strong electric side to the weak electric side and stepped down, and then, utilized as electric power for driving the energization control circuit unit 74. Further, the regenerative electric power is also supplied to the second step-down circuit unit 75 and used for the actuation of the comparator 68. Thereby, the regenerative electric power equal to or more than the capacity of the regenerative capacitor 63 may be effectively utilized. Particularly, the energization control circuit unit 74 is a circuit constantly consuming electric power while driving the robot 1 and the regenerative electric power is utilized as electric power for driving the energization control circuit unit 74, and thereby, discharge control with the time when electric power is consumed and a circuit for the discharge control may be omitted and the regenerative electric power may be effectively utilized by a simple configuration.

As described above, the control apparatus 3 controls driving of the motor M1 to motor M6 of the robot arm 10 and includes the input terminals 62A supplying electric power from the alternating-current power supply 61, the plurality of input/output terminals 62B inputting and outputting electric power to and from the motor M1 to motor M6, the first converter circuit unit 62 converting and outputting the alternating currents input from the input terminals 62A into direct currents, the drive circuit unit 64 converting and outputting the direct current output from the first converter circuit unit 62 into the alternating current to the plurality of input/output terminals 62B, to which the regenerative electric power from the motor M1 to motor M6 is input from the plurality of input/output terminals 62B, the discharge resistance unit 65 parallel-coupled to the drive circuit unit 64, to which the regenerative electric power is input from the drive circuit unit 64 and, when the voltage value of the regenerative electric power exceeds the threshold value B, consuming the electric power, the second converter circuit unit 71 parallel-coupled to the first converter circuit unit 62, converting and outputting the alternating currents input from the input terminals 62A into the direct currents, the first step-down circuit unit 73 stepping down and outputting the voltage of the current output from the second converter circuit unit 71, the energization control circuit unit 74 actuated by the direct current output from the first step-down circuit unit 73 and controlling the drive circuit unit 64, and the regenerative electric power supply unit 76 having the regenerative diode 761 coupled to the discharge resistance unit 65 and outputting the direct current of the regenerative electric power to the first step-down circuit unit 73. Thereby, the regenerative electric power may be utilized as electric power for driving the energization control circuit unit 74. Therefore, when the regenerative electric power is reutilized, complex circuits and control as in related art may be omitted and the regenerative electric power may be effectively utilized by a simple configuration. As a result, the control apparatus 3 may be driven by lower power consumption.

Further, the robot system 100 includes the robot 1 having the robot arm 10 and the control apparatus 3 controlling driving of the robot arm 10. Thereby, the regenerative electric power may be utilized as electric power for driving the energization control circuit unit 74. Therefore, a circuit for discharge control with the time when electric power is consumed may be omitted and the regenerative electric power may be effectively utilized by a simple configuration. As a result, the control apparatus 3 may be driven by lower power consumption and energy may be saved in the robot system 100 as a whole.

In the regenerative electric power supply unit 76, the terminal at the input side of the regenerative diode 761 is coupled between the first converter circuit unit 62 and the discharge resistance unit 65 and the terminal at the output side of the regenerative diode 761 is coupled to the input side terminal of the first step-down circuit unit 73. Thereby, the regenerative electric power generated in the motor M1 to motor M6 may be collectively supplied to the first step-down circuit unit 73. Note that the input side of the regenerative diode 761 may be coupled to the drive circuit unit 64 or the input side thereof. In this case, it is preferable to provide the regenerative diodes 761 respectively corresponding to the motor M1 to motor M6.

Next, a relationship between the voltage value A of the current input to the first step-down circuit unit 73 and the threshold value B of the voltage value of the regenerative electric power of the motor M1 to motor M6 will be explained.

It is preferable that the voltage value A of the current input to the first step-down circuit unit 73 is smaller than the threshold value B. Thereby, the frequency of the application of the voltage to the discharge resistance unit 65 may be suppressed to be lower and the frequency of supply of the regenerative electric power to the energization control circuit unit 74 may be increased. Therefore, the regenerative electric power may be utilized more effectively.

Further, the voltage value A has a region, i.e., a predetermined range depending on the individual difference of the element.

The center value of the voltage value A is A3 and, with A3 at the center, the minimum value is A1 and the maximum value is A2. Note that the set value set by the output voltage setting resistor 721 of the power factor corrector unit 72 is the center value A3. A1 is from about 370 V to 380 V, for example. A2 is from about 385 V to 395 V.

The threshold value B has a region, i.e., a predetermined range depending on the individual difference of the element.

The center value of the threshold value B is B3 and, with B3 at the center, the minimum value is B1 and the maximum value is B2. Note that the set value set by the power supply voltage for comparator of the comparator 68 is the center value B3. Accordingly, it is preferable that the precision of the power supply voltage for comparator is less than 5%. Further, the threshold value B takes a value different from the center value B3 due to resistance errors of the resistors R1 to R4 of the comparator 68. The resistance precision of the resistors R1 to R4 is increased, and thereby, the minimum value B1 may be increased and the maximum value B2 may be decreased. Accordingly, it is preferable that the resistance precision of the resistors R1 to R4 is less than 1%. B1 is from about 390 V to 400 V, for example. B2 is from about 415 V to 425 V.

These voltage values satisfy the following relationships, and thereby, the effects as below may be respectively obtained.

1. A relationship of A1<B1<A3<A2<B2 is satisfied (see FIG. 4).

Thereby, there may be a region in which the range of the voltage value A and the range of the threshold value B do not overlap. Therefore, the frequency of supply of the regenerative electric power to the energization control circuit unit 74 may be increased and the regenerative electric power may be utilized more effectively.

2. A relationship of A1<A3<B1<A2<B2 is satisfied (see FIG. 5).

Thereby, the region in which the range of the voltage value A and the range of the threshold value B do not overlap may be made even wider. Therefore, the frequency of supply of the regenerative electric power to the energization control circuit unit 74 may be further increased and the regenerative electric power may be utilized even more effectively.

Note that, when the range of the voltage value A and the range of the threshold value B overlap, low-cost parts may be used for the parts of the resistor of the discharge resistance unit 65, the regenerative capacitor 63, etc.

3. A relationship of A2 B1 is satisfied (see FIG. 6).

Thereby, the region in which the range of the voltage value A and the range of the threshold value B do not overlap may be made as wide as possible. Therefore, the frequency of supply of the regenerative electric power to the energization control circuit unit 74 may be further increased and the regenerative electric power may be utilized more effectively. In this case, it is preferable that the difference between A2 and B1 is as small as possible.

As described above, it is preferable that the voltage value A and the threshold value B have predetermined ranges and, when the maximum value of the voltage value A is A2, the center value at the center of the predetermined range of the voltage value A is A3, and the minimum value of the threshold value B is B1, a relationship A3<B1<A2 is satisfied. Thereby, the region in which the range of the voltage value A and the range of the threshold value B do not overlap may be made even wider. Therefore, the frequency of supply of the regenerative electric power to the energization control circuit unit 74 may be further increased and the regenerative electric power may be utilized even more effectively.

Further, it is preferable that the voltage value A and the threshold value B have predetermined ranges and, when the maximum value of the voltage value A is A2 and the minimum value of the threshold value B is B1, a relationship A2 B1 is satisfied. Thereby, the region in which the range of the voltage value A and the range of the threshold value B do not overlap may be made as wide as possible. Therefore, the frequency of supply of the regenerative electric power to the energization control circuit unit 74 may be further increased and the regenerative electric power may be utilized even more effectively.

It is preferable that the power factor corrector unit 72 has the output voltage setting resistor 721 setting the voltage output to the first step-down circuit unit 73 and the resistance precision of the output voltage setting resistor 721 is 1% or less. Thereby, A2 as the maximum value of the voltage value A may be easily set, particularly, to be lower. Therefore, the unit contributes to the satisfaction of the above described 1. 2. 3. relationships of the voltage values and the above described effects may be easily obtained.

The control apparatus 3 includes the comparator 68 selecting whether electric power is supplied to the discharge resistance unit 65 based on the threshold value B and the resistance precision of the resistors of the comparator 68 is 1% or less. Thereby, B1 as the minimum value of the threshold value B may be easily set, particularly, to be higher. Therefore, the unit contributes to the satisfaction of the above described 1. 2. 3. relationships of the voltage values and the above described effects may be easily obtained.

Note that the control circuit 10A has the power factor corrector unit 72 in the embodiment, however, as a modified example, as shown in FIG. 7, a configuration without the power factor corrector unit 72 may be employed. In this case, the first step-down circuit unit 73 is coupled to the second converter circuit unit 71. The terminal at the output side of the regenerative diode 761 of the regenerative electric power supply unit 76 is coupled between the second converter circuit unit 71 and the first step-down circuit unit 73. Further, the first step-down circuit unit 73 is a flyback DC/DC converter or the like. Also, in this configuration, the regenerative electric power may be utilized as electric power for driving the energization control circuit unit 74.

As above, the control apparatus and the robot system of the present disclosure are explained based on the illustrated embodiments, however, the present disclosure is not limited to those. The respective units of the control apparatus and the robot system may be replaced by any structures that may exert the same functions. Further, any structure may be added thereto.

What is claimed is:

1. A control apparatus controlling driving of a motor of a robot arm, comprising:
   a terminal supplying electric power from an alternating-current power supply;
   a plurality of input/output terminals inputting and outputting electric power to and from the motor;
   a first converter circuit unit converting and outputting an alternating current input from the terminal into a direct current;
   a drive circuit unit converting and outputting the direct current output from the first converter circuit unit into an alternating current to the plurality of input/output terminals, to which regenerative electric power from the motor is input from the plurality of input/output terminals;
   a discharge resistance unit parallel-coupled to the drive circuit unit, to which the regenerative electric power is input from the drive circuit unit, and, when a voltage value of the regenerative electric power exceeds a threshold value, consuming electric power;
   a second converter circuit unit parallel-coupled to the first converter circuit unit and converting and outputting the alternating current input from the terminal into a direct current;
   a first step-down circuit unit stepping down and outputting a voltage of the current output from the second converter circuit unit;
   an energization control circuit unit actuated by the direct current output from the first step-down circuit unit and controlling the drive circuit unit; and
   a regenerative electric power supply unit having a regenerative diode coupled to the discharge resistance unit and outputting a direct current of the regenerative electric power to the first step-down circuit unit, wherein
   a voltage of the current input to the first step-down circuit unit is less than the threshold value,
   the voltage and the threshold value have predetermined ranges, and
   A3<B1<A2 where a maximum value of the voltage is A2, a center value at a center of the predetermined range of the voltage is A3, and a minimum value of the threshold value is B1.

2. The control apparatus according to claim 1, wherein the regenerative electric power supply unit has a terminal at an input side of the regenerative diode coupled between the first converter circuit unit and the discharge resistance unit, and a terminal at an output side of the regenerative diode coupled to an input side terminal of the first step-down circuit unit.

3. The control apparatus according to claim 1, wherein the voltage and the threshold value have predetermined ranges, and
A2≤B1 where a maximum value of the voltage is A2 and a minimum value of the threshold value is B1.

4. The control apparatus according to claim 1, further comprising a power factor corrector unit correcting and outputting a power factor of the electric power supplied from the regenerative electric power supply unit to the first step-down circuit unit.

5. The control apparatus according to claim 4, wherein
the power factor corrector unit has an output voltage setting resistor setting the voltage output to the first step-down circuit unit, and
resistance precision of the output voltage setting resistor is equal to or less than 1%.

6. The control apparatus according to claim 1, further comprising a comparator selecting whether electric power is supplied to the discharge resistance unit based on the threshold value, wherein
resistance precision of a resistor of the comparator is equal to or less than 1%.

7. A robot system comprising:
a robot having a robot arm; and
the control apparatus controlling driving of the robot arm according to claim 1.

8. A control apparatus controlling driving of a motor of a robot arm, comprising:
a terminal supplying electric power from an alternating-current power supply;
a plurality of input/output terminals inputting and outputting electric power to and from the motor;
a first converter circuit unit converting and outputting an alternating current input from the terminal into a direct current;
a drive circuit unit converting and outputting the direct current output from the first converter circuit unit into an alternating current to the plurality of input/output terminals, to which regenerative electric power from the motor is input from the plurality of input/output terminals;
a discharge resistance unit parallel-coupled to the drive circuit unit, to which the regenerative electric power is input from the drive circuit unit, and, when a voltage value of the regenerative electric power exceeds a threshold value, consuming electric power;
a second converter circuit unit parallel-coupled to the first converter circuit unit and converting and outputting the alternating current input from the terminal into a direct current;
a first step-down circuit unit stepping down and outputting a voltage of the current output from the second converter circuit unit;
an energization control circuit unit actuated by the direct current output from the first step-down circuit unit and controlling the drive circuit unit;
a regenerative electric power supply unit having a regenerative diode coupled to the discharge resistance unit and outputting a direct current of the regenerative electric power to the first step-down circuit unit; and
a power factor corrector unit correcting and outputting a power factor of the electric power supplied from the regenerative electric power supply unit to the first step-down circuit unit, wherein
the power factor corrector unit has an output voltage setting resistor setting the voltage output to the first step-down circuit unit, and
resistance precision of the output voltage setting resistor is equal to or less than 1%.

\* \* \* \* \*